United States Patent
Meyer et al.

(10) Patent No.: US 8,838,995 B2
(45) Date of Patent: Sep. 16, 2014

(54) PHYSICALLY MODIFYING A DATA STORAGE DEVICE TO DISABLE ACCESS TO SECURE DATA AND REPURPOSE THE DATA STORAGE DEVICE

(75) Inventors: Alan T. Meyer, Anaheim Hills, CA (US); Kenny T. Coker, Corona, CA (US); Daniel D. Reno, Morgan Hill, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 903 days.

(21) Appl. No.: 12/475,340

(22) Filed: May 29, 2009

(65) Prior Publication Data

US 2010/0306551 A1 Dec. 2, 2010

(51) Int. Cl.
*G06F 21/00* (2013.01)
*G06F 21/80* (2013.01)

(52) U.S. Cl.
CPC .................................. *G06F 21/80* (2013.01)
USPC ....................................................... 713/189

(58) Field of Classification Search
USPC ....................................................... 711/100
See application file for complete search history.

(56) References Cited

U.S. PATENT DOCUMENTS

| | | | |
|---|---|---|---|
| 4,815,032 A | 3/1989 | Fujii | |
| 5,237,616 A | 8/1993 | Abraham et al. | |
| 6,564,307 B1 | 5/2003 | Micka et al. | |
| 6,735,693 B1 | 5/2004 | Hamlin | |
| 7,054,990 B1 * | 5/2006 | Tamura et al. | 711/103 |
| 7,349,118 B2 | 3/2008 | Zipprich et al. | |
| 2002/0073340 A1 * | 6/2002 | Mambakkam et al. | 713/202 |
| 2002/0077992 A1 * | 6/2002 | Tobin | 705/65 |
| 2002/0196572 A1 | 12/2002 | Bress et al. | |
| 2004/0050942 A1 * | 3/2004 | Ueda et al. | 235/492 |
| 2004/0114265 A1 | 6/2004 | Talbert | |
| 2004/0242029 A1 * | 12/2004 | Nakamura et al. | 439/66 |
| 2005/0005131 A1 * | 1/2005 | Yoshida et al. | 713/183 |
| 2005/0063542 A1 | 3/2005 | Ryu | |

(Continued)

FOREIGN PATENT DOCUMENTS

| | | |
|---|---|---|
| CN | 1595527 A | 3/2005 |
| CN | 1816785 A | 8/2006 |

OTHER PUBLICATIONS

Seagate Technology Paper, "Self-Encrypting Hard Disk Drives in the Data Center", Publication No. TP583.1-0711US, Nov. 2007, 6 pages.

(Continued)

*Primary Examiner* — Ali Abyaneh

(57) ABSTRACT

A data storage device is disclosed comprising a non-volatile memory and control circuitry operable to evaluate a physical feature of the data storage device, wherein the physical feature is physically alterable by a user. When the physical feature is in a first state, host access to first secure data stored in the non-volatile memory is enabled, and when the physical feature is in a second state, the host access to the first secure data is disabled and host access to second data stored in the non-volatile memory is enabled.

28 Claims, 8 Drawing Sheets

(56) References Cited

U.S. PATENT DOCUMENTS

| | | |
|---|---|---|
| 2005/0182951 A1 | 8/2005 | Sohn |
| 2006/0047861 A1* | 3/2006 | Hung et al. ............. 710/11 |
| 2006/0130156 A1* | 6/2006 | Ng et al. ............. 726/33 |
| 2007/0300078 A1* | 12/2007 | Ochi et al. ............. 713/189 |
| 2008/0046998 A1 | 2/2008 | Cromer et al. |
| 2008/0072071 A1 | 3/2008 | Forehand et al. |
| 2008/0155680 A1 | 6/2008 | Guyot et al. |
| 2009/0013134 A1* | 1/2009 | Chen et al. ............. 711/152 |
| 2009/0241200 A1* | 9/2009 | Li et al. ............. 726/27 |
| 2009/0303050 A1* | 12/2009 | Choi ............. 340/572.7 |

OTHER PUBLICATIONS

Microsoft Windows, "Secure Startup—Full Volume Encryption: Executive Overview, Hardware-Based Security for Windows Vista", WinHEC 2005 Version, Apr. 21, 2005, 8 pages.

Trusted Computing Group, "A Guide to the TCG Demonstrations RSA Conference 2008, Seagate, Full Disk Encryption (FDE) Drives", 2 pages.

Office Action dated Nov. 27, 2013 from China Patent Application No. 201010192844.2 to Meyer et al., 22 pages.

\* cited by examiner

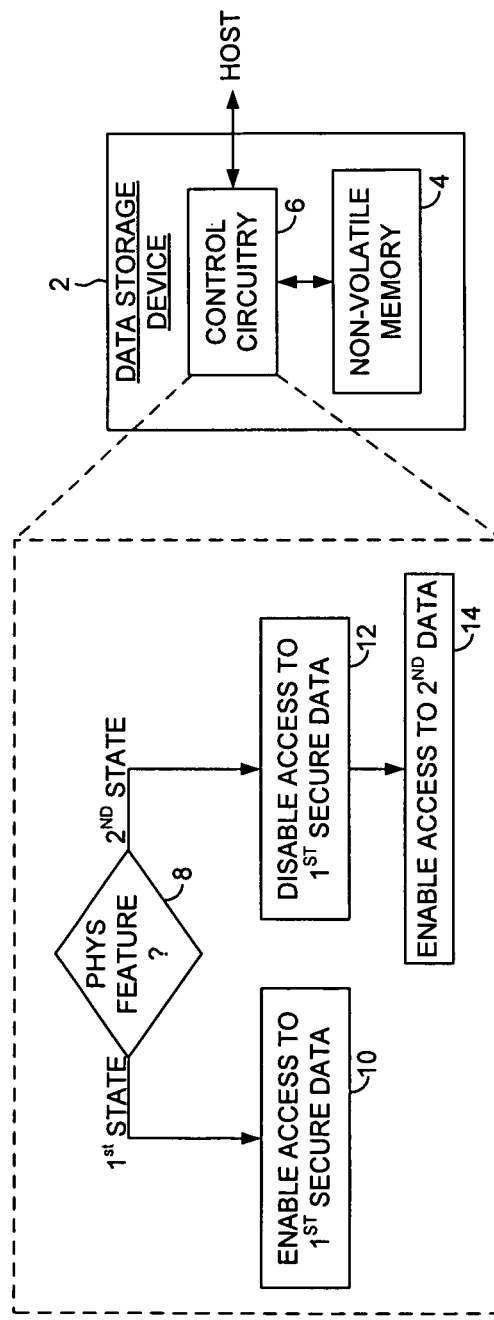

PHYSICALLY MODIFYING A DATA STORAGE DEVICE TO DISABLE ACCESS TO SECURE DATA AND REPURPOSE THE DATA STORAGE DEVICE

BACKGROUND

Description of the Related Art

Computer systems (e.g., desktops, laptops, portables, etc) typically employ some form of a non-volatile data storage device such as a disk drive, or a solid state drive comprising a non-volatile semiconductor memory such as flash memory. A solid state drive typically emulates a disk drive so that the same communication protocol may be employed. That is, a host typically interfaces with a solid state drive using a standard disk drive communication protocol, such as the Advanced Technology Attachment (ATA) protocol.

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a servo controller to control the velocity of the actuator arm as it seeks from track to track.

Data storage devices may employ one or more security features, such as authenticating users accessing the data storage device and/or encrypting the stored user data to prevent unauthorized access of the user data. Secret keys may be stored in the data storage device to implement the security features, such as keys for generating message authentication codes and/or keys for implementing an encryption algorithm (e.g., RSA, DES, etc.). The prior art has suggested to completely disable a data storage device if tampering of the security features is detected, such as tampering with the circuitry or firmware used to implement the secret keys and/or the security algorithms.

BRIEF DESCRIPTION OF THE DRAWINGS

FIG. 1A shows a data storage device according to an embodiment of the present invention comprising control circuitry and a non-volatile memory.

FIG. 1B is a flow diagram executed by the control circuitry according to an embodiment of the present invention wherein a physical feature is altered by a user to disable host access to first secure data and repurpose the data storage device by allowing host access to second data.

DETAILED DESCRIPTION OF EMBODIMENTS OF THE INVENTION

FIG. 1A shows a data storage device 2 according to an embodiment of the present invention comprising a non-volatile memory 4 and control circuitry 6 operable to evaluate a physical feature of the data storage device 2, wherein the physical feature is physically alterable by a user. FIG. 1B shows a flow diagram executed by the control circuitry 6 according to an embodiment of the present invention wherein when the physical feature is in a first state (step 8), host access to first secure data stored in the non-volatile memory is enabled (step 10), and when the physical feature is in a second state (step 8), the host access to the first secure data is disabled (step 12) and host access to second data stored in the non-volatile memory is enabled (step 14).

In one embodiment, disabling host access to the first secure data and enabling access to second data allows the data storage device to be repurposed. For example, if a number of data storage devices deployed in a secure application are removed from a storage bay (e.g., during an upgrade), host access to the first secure data may be quickly disabled by simply altering the physical feature of the data storage device. The data storage devices may then be reused in another application rather than be discarded.

Figure 2A:
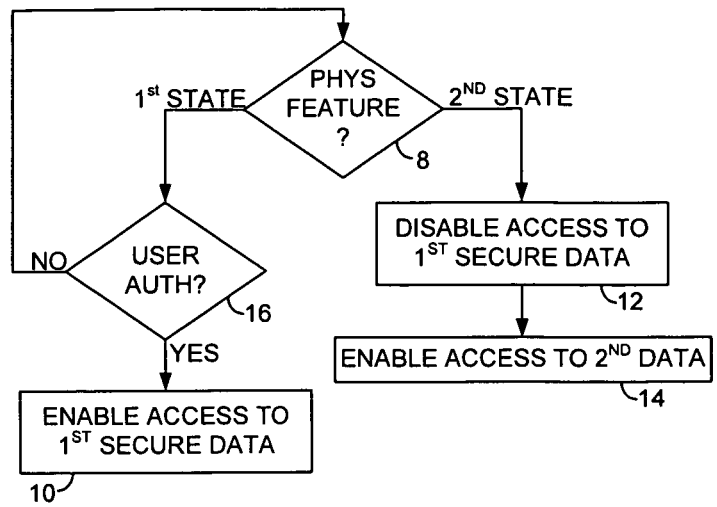
FIG. 2A is a flow diagram according to an embodiment of the present invention wherein the host access to the first secure data is authenticated.

The first secure data may be stored securely in any suitable manner. In an embodiment shown in FIG. 2A, a user is authenticated (step 16) using any suitable authentication technique, such as a password or biometrics, before allowing access to the first secure data. In one embodiment, if the physical feature is altered (step 8), disabling the host access to the first secure data (step 12) comprises disabling the authentication feature (e.g., by erasing the authentication information).

Figure 2B:
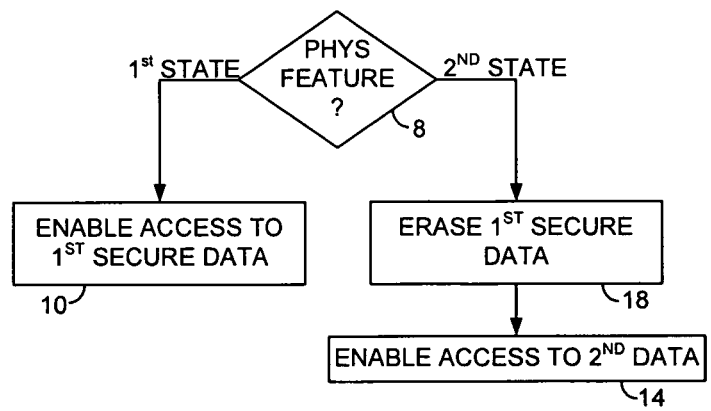
FIG. 2B is a flow diagram according to an embodiment of the present invention wherein disabling the host access comprises erasing the first secure data.

The host access to the first secure data may also be disabled using other suitable techniques. In an embodiment shown in FIG. 2B, the host access to the first secure data is disabled by erasing the first secure data (step 18). In one embodiment, erasing the first secure data occurs the first time the data storage device is powered on after the physical feature has been altered. After the first secure data has been erased, the corresponding locations used to store the first secure data may be reused to store the second data.

Figure 2C:
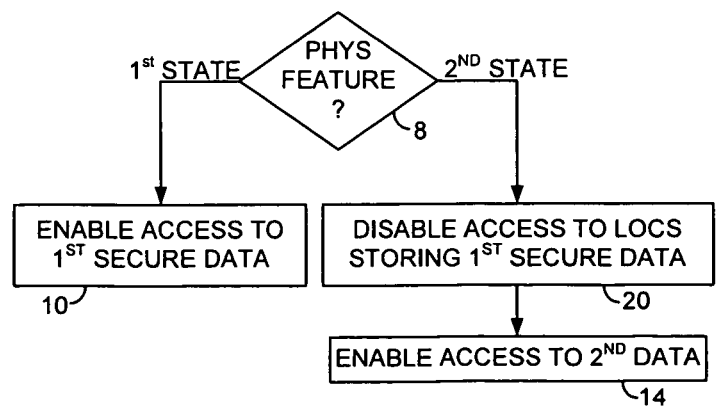
FIG. 2C is a flow diagram according to an embodiment of the present invention wherein disabling the host access comprises disabling access to storage locations in the non-volatile memory storing the first secure data.

In an alternative embodiment shown in FIG. 2C, the host access to the first secure data is disabled by disabling access to locations of the non-volatile memory storing the first secure data (step 20). After the data storage device has been repurposed, the second data is stored in other locations of the non-volatile memory. For example, the non-volatile memory may be partitioned into a first area for storing the first secure data and a second area for storing the second data. In an alternative embodiment, the second data is stored in any location of the non-volatile memory that was not used to store the first secure data. In yet another embodiment, the locations storing the first secure data may be configured as write-only until overwritten by the second data, at which time the locations may be configured as read/write locations.

Figure 3A:
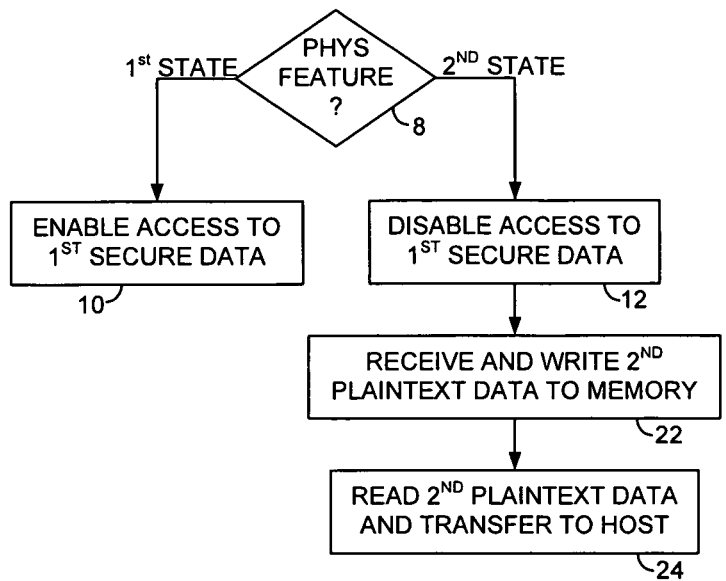
FIG. 3A is a flow diagram according to an embodiment of the present invention wherein the second data is stored as plaintext data in the non-volatile memory.

The second data may be stored in the data storage device in any suitable format. In an embodiment shown in FIG. 3A, the second data received from the host is written as plaintext data to the non-volatile memory (step 22). When a host access command is received, the plaintext data is transmitted from the non-volatile memory to the host (step 24). In this manner, the data storage device may be repurposed into a general data storage device after altering the physical feature to disable access to the first secure data.

Figure 3B:
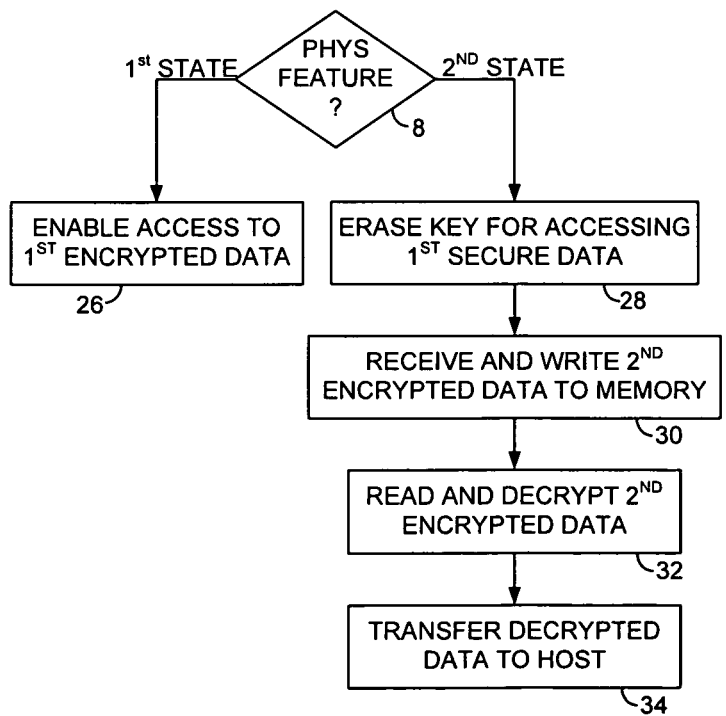
FIG. 3B is a flow diagram according to an embodiment of the present invention wherein disabling the host access comprises erasing a decryption key for decrypting the first secure data.

FIG. 3B is a flow diagram according to an embodiment of the present invention wherein the first secure data is stored in the non-volatile memory after being encrypted using a suitable encryption algorithm (step 26). The host access to the first secure data is disabled by erasing a key used to decrypt the first secure data (step 28). FIG. 3B also illustrates an embodiment of the present invention wherein the second data received from the host is encrypted before it is written to the non-volatile memory (step 30). When a host command is received to access the second data, the second data is decrypted using a different key (step 32) and the decrypted data transferred to the host (step 34).

In one embodiment, while the physical feature is configured into a first state, a first set of secrete encryption/decryption keys are used to store and retrieve data from the non-volatile memory (the first secure data). When the physical feature is configured into a second state, a second set of secrete encryption/decryption keys are used to store and retrieve the data (the second data). In one embodiment, the state of the physical feature is used to generate the encryption/decryption keys, for example, by generating a digital value representing the state of the physical feature.

Figure 4A:
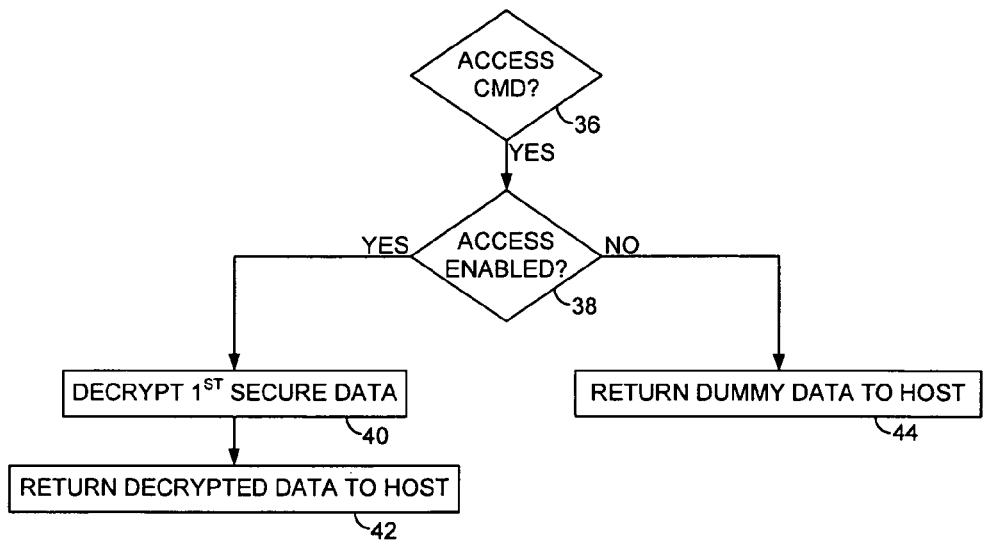
FIG. 4A is a flow diagram according to an embodiment of the present invention wherein when a host command is received to access the first secure data after host access has been disabled, dummy data is returned to the host.
Figure 4B:
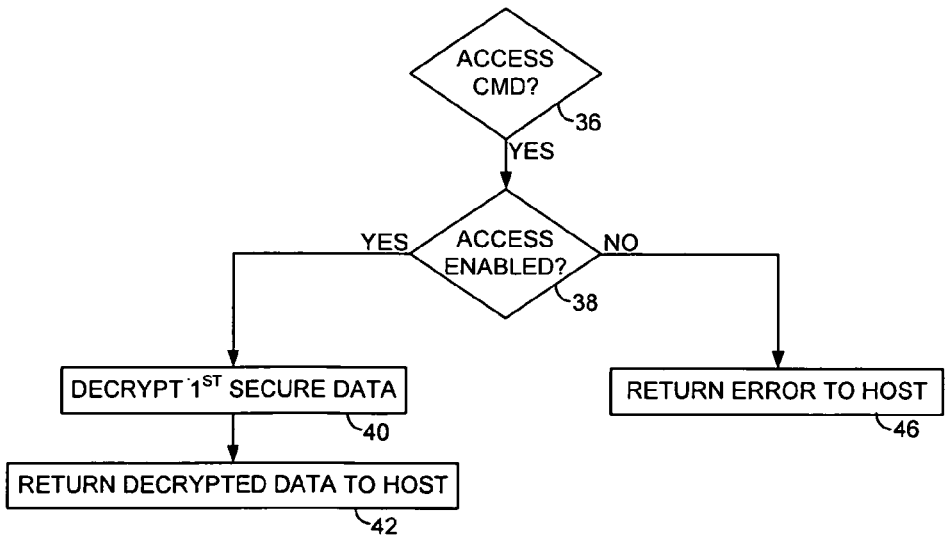
FIG. 4B is a flow diagram according to an embodiment of the present invention wherein when a host command is received to access the first secure data after host access has been disabled, an error message is returned to the host.

If the physical feature of the data storage device has been altered so as to disable the host access to the first secure data, the data storage device may still receive a host command to access the secure data. In an embodiment shown in FIG. 4A, if a host access command is received (step 36) and the host access is enabled (step 38), then the first secure data is decrypted (step 40) and the decrypted data returned to the host (step 42). However, if the host access is disabled (step 38), then dummy data is returned to the host (step 44). Any suitable dummy data may be returned, such as the first secure data in encrypted form, scrambled data, or all zeros. In this manner, the data storage device is able to return data in response to an access command rather than not respond, or respond with an error message the host may not understand. In an alternative embodiment shown in FIG. 4B, the data storage device may return an error message (step 46) to inform the host that the first secure data is inaccessible.

Figure 5A:
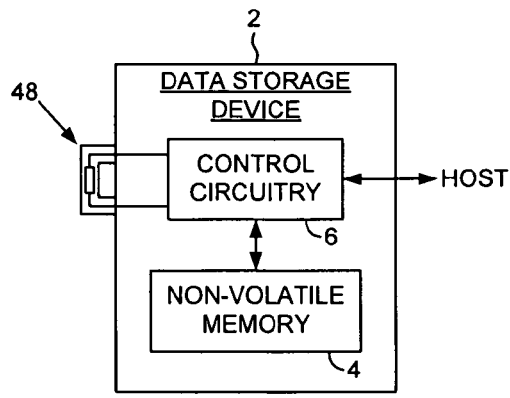
FIG. 5A shows a data storage device according to an embodiment of the present invention wherein the physical featured altered by the user comprises a passive component, such as a resistor, capacitor or inductor.

The data storage device may comprise any suitable physical feature that is physically alterable by a user to disable host access to the first secure data. FIG. 5A shows a data storage device 2 according to an embodiment of the present invention wherein the physical feature comprises a passive component 48 comprising at least one of a resistor, an inductor, and a capacitor. In one embodiment, the passive component 48 is snapped off of the data storage device 2 and discarded. In another embodiment, a one-way switch is employed to disconnect or destroy the passive component without removing it. When the data storage device is powered on, or during a periodic interval, the control circuitry 6 may measure a value of the passive component 48 to verify its state. If the value changes, indicating the passive component has been tampered with or has been reconfigured, the control circuitry 6 disables access to the first secure data as described above.

Figure 5B:
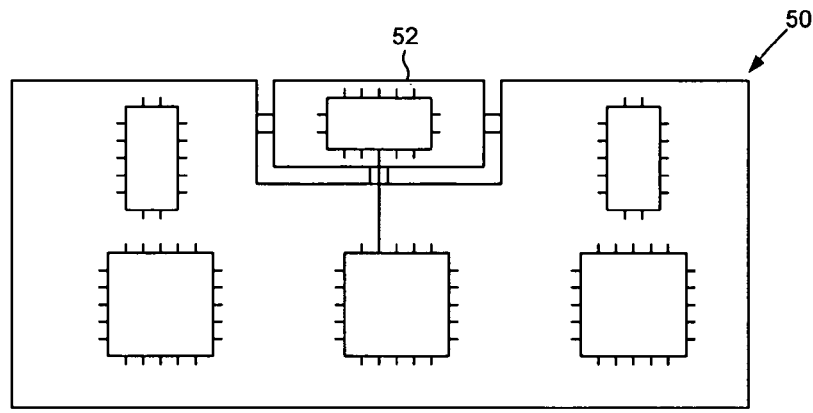
FIG. 5B shows a data storage device according to an embodiment of the present invention wherein the physical featured altered by the user comprises a snap-off piece of a printed circuit board.

In one embodiment of the present invention, the data storage device comprises a printed circuit board 50 including a plurality of mounted chips, wherein the physical feature comprises one of the chips. For example, one of the chips may be dedicated for storing the encryption/decryption keys, or for implementing the cipher algorithms. Once the chip is removed, destroyed, or otherwise disabled, access to the first secure data is disabled. FIG. 5B shows an embodiment wherein a portion 52 of the printed circuit board 50 comprising one of the chips is detachable. For example, a portion of the printed circuit board may be fabricated with break-away tabs that may be snapped apart from the main part of the printed circuit board as shown in FIG. 5B. In one embodiment, the traces for coupling the security chip to the other chips may be routed through the tabs as shown in FIG. 5B, and in one embodiment, the traces may be fabricated in internal layers of the printed circuit board to help prevent a hacker from replacing the missing portion of the printed circuit board with an imposter.

Figure 5C:
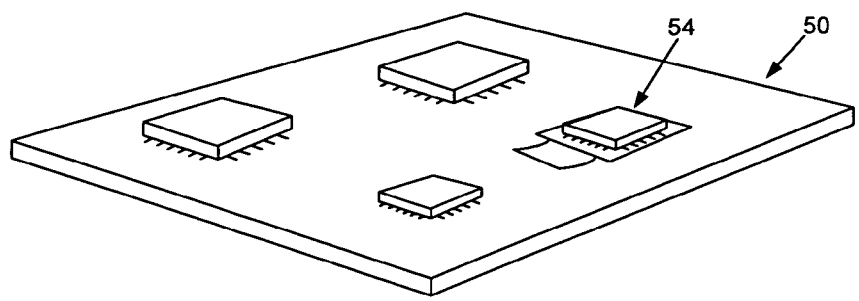
FIG. 5C shows a data storage device according to an embodiment of the present invention wherein the physical featured altered by the user comprises a chip removable with a pull tab.

In an embodiment shown in FIG. 5C, the printed circuit board 50 comprises a chip 54 that is detachable using a pull tab integrated with the surface mounting feature of the chip. A user configures the physical feature of the data storage device by pulling the pull-tab to remove the security chip from the printed circuit board. In another embodiment, the security chip may be removed by simply prying the chip off of the printed circuit board, for example, using a screw driver.

Figure 5D:
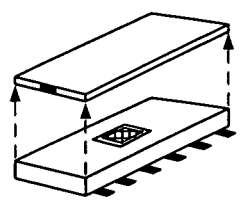
FIG. 5D shows a data storage device according to an embodiment of the present invention wherein the physical featured altered by the user comprises a modifiable chip package.

In one embodiment, the physical feature of the data storage device comprises a modifiable package of one of the chips. FIG. 5D shows an example of this embodiment wherein the chip package comprises a removable cap that once removed renders the chip inoperable. In another embodiment, the chip package may be penetrable using a sharp tool in order to destroy the internal circuitry. In yet other embodiments, the chip may be manufactured using other tamper resistant techniques for detecting when the chip has been modified or probed.

In one embodiment, a user can verify the state of the physical feature through visual inspection. For example, the user can verify that a passive component 48 has been physically removed, or that a security chip has been removed or otherwise altered to verify that the host access to the first secure data has been disabled. In another embodiment, the physical feature may be reversible by a user so that disabling host access to the first secure data is only temporary.

Figure 5E:
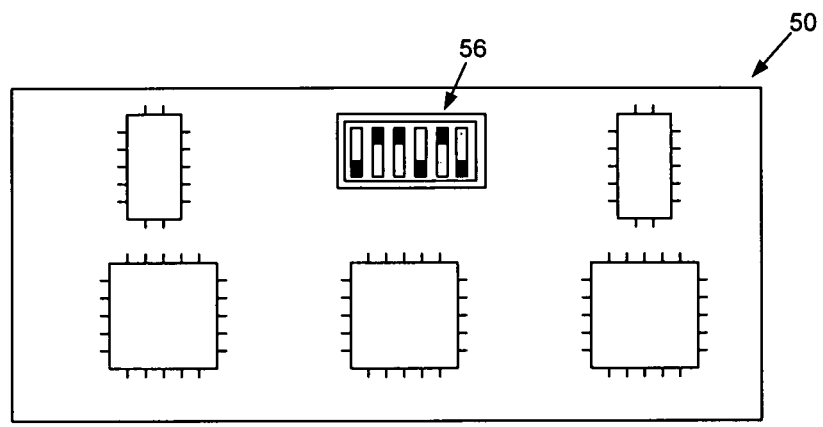
FIG. 5E shows a data storage device according to an embodiment of the present invention wherein the physical featured altered by the user comprises a plurality of dip switches.
Figure 5F:
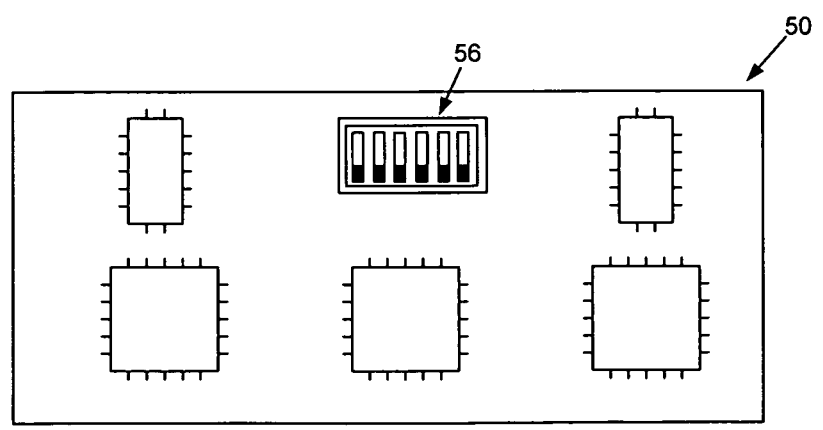
FIG. 5F illustrates an embodiment of the present invention wherein the dip switches are configured so as to disable the host access to the first secure data.

FIG. 5E shows an example embodiment wherein the physical feature comprises a plurality of dip switches 56 which may be mounted on the printed circuit board or any other suitable location on the data storage device. The dip switches 56 may act as a combination code that locks/unlocks access to the first secure data depending on the state of the dip switches. If the dip switches are configured into a different state as shown in FIG. 5F, the new setting may change the secrete encryption/decryption keys for storing data in the non-volatile memory, or it may configure the data storage device to store data as plaintext. In one embodiment, there a number of valid dip switch settings, wherein each setting corresponds to a different storage area in the non-volatile memory. In an alternative embodiment, each dip switch setting changes the accessibility of the entire non-volatile memory so that if the setting is changed, the storage locations may be overwritten with newly encrypted (or plaintext) data. If a previously written storage location is read, the encrypted data may be decrypted using the wrong key, and therefore the data storage device will return scrambled data.

Figure 6:
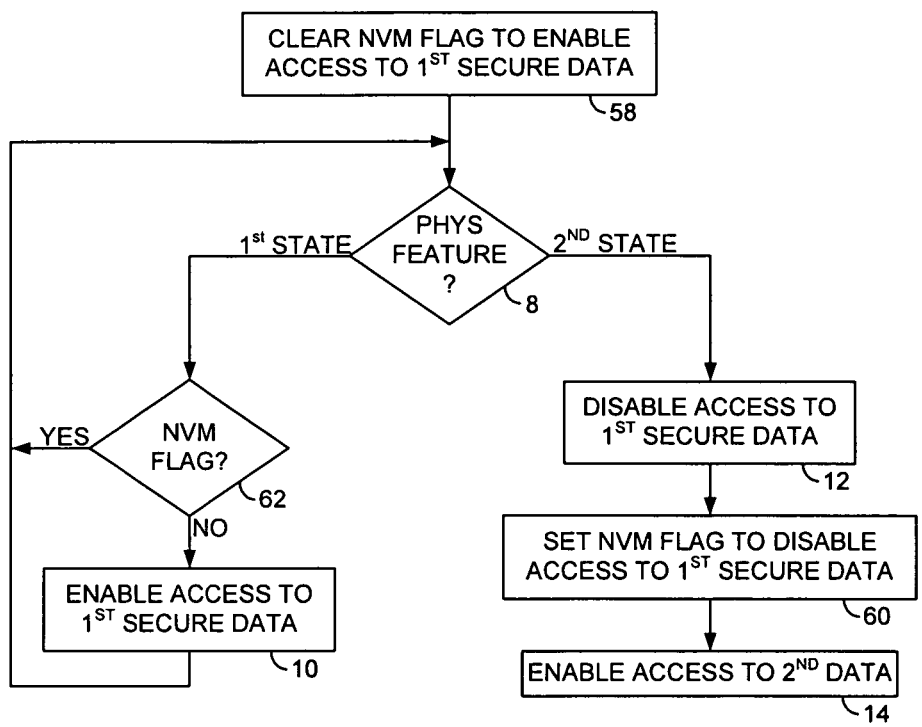
FIG. 6 is a flow diagram according to an embodiment of the present invention wherein after altering the physical feature to disable the host access to the first secure data, a flag is set in the non-volatile memory to disable the host access regardless as to the state of the physical feature.

FIG. 6 is a flow diagram according to an embodiment of the present invention wherein the control circuitry maintains a flag in the non-volatile memory to further protect unauthorized access to the first secure data. In the embodiment of FIG. 6, the flag is cleared (step 58) so that when the physical feature is in the first state (step 8), host access to the first secure data is enabled (step 10). The flag may be cleared (step 58) at any suitable time, such as during a manufacturing procedure or after a user has been authenticated to access the first secure data. If a user alters the physical feature to the second state (step 8) in order to disable host access to the first secure data (step 12), the flag is also set (step 60). If a hacker attempts to reconfigure the physical feature back into the first state after the flag has been set, the host access to the secure data is denied (step 62). In one embodiment, the flag is set when the data storage device is first powered on after configuring the physical feature into the second state. Thus, a hacker has only one chance to reconfigure the physical feature back into the first state before the flag is set.

Figure 7:
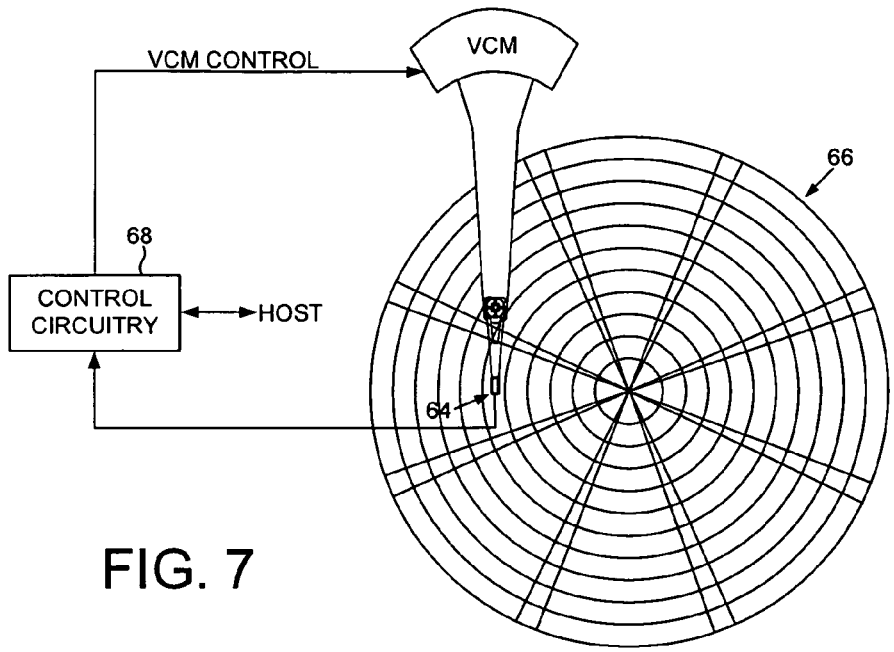
FIG. 7 shows an embodiment of the present invention wherein the data storage device comprises a disk drive.
Figure 8:
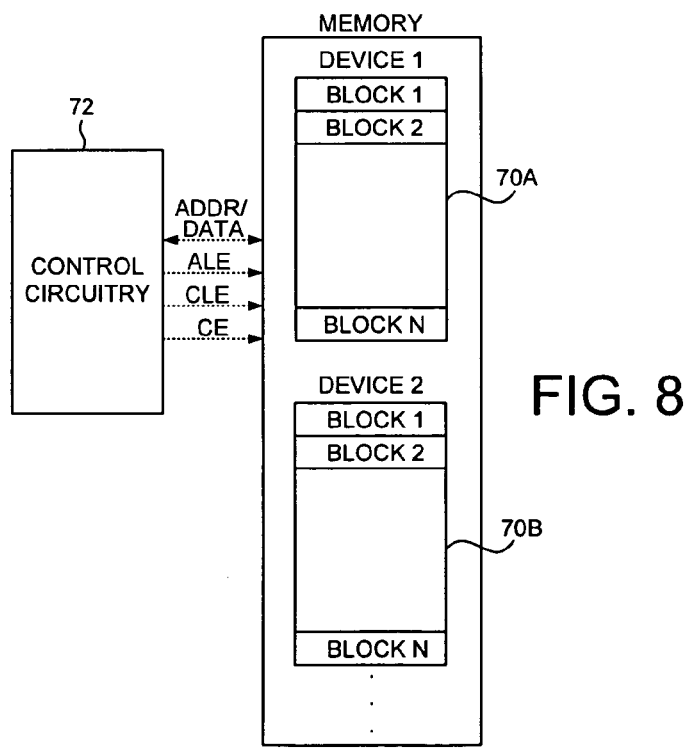
FIG. 8 shows an embodiment of the present invention wherein the data storage device comprises a solid state drive.

The embodiments of the present invention may be employed in any suitable data storage device. FIG. 7 shows a data storage device comprising a disk drive including a head 64 actuated over a disk 66 and control circuitry 68 for executing the flow diagrams described herein. FIG. 8 shows a solid state drive comprising a plurality of non-volatile semiconductor memories 70A, 70B, etc., such as flash memories, and control circuitry 72 for executing the flow diagrams described herein. A hybrid data storage device may also be employed comprising components of a disk drive shown in FIG. 7 combined with the non-volatile semiconductor memories shown in FIG. 8.

Any suitable control circuitry may be employed to implement the flow diagrams in the embodiments of the present invention, such as any suitable integrated circuit or circuits. In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a system on a chip (SOC). In another embodiment, the instructions are read into a volatile semiconductor memory when the data storage device is powered on. In yet another embodiment, the control circuitry comprises suitable logic circuitry, such as state machine circuitry.

What is claimed is:

1. A data storage device comprising:
   a printed circuit board including a plurality of mounted chips each comprising internal circuitry;
   a non-volatile memory; and
   control circuitry operable to:
      evaluate a physical feature of one of the chips, wherein the physical feature is physically alterable by a user;
      when the physical feature is in a first state. enable host access to first secure data stored in the non-volatile memory; and
      when the physical feature is in a second state, disable the host access to the first secure data and enable host access to second data stored in the non-volatile memory,
      wherein the physical feature comprises a modifiable package of one of the chips, and modifying the package of one of the chips destroys at least part of the internal circuitry of the chip.

2. The data storage device as recited in claim 1, wherein the control circuitry is further operable to authenticate the host access to the first secure data.

3. The data storage device as recited in claim 1, wherein the control circuitry is further operable to disable the host access to the first secure data by erasing the first secure data.

4. The data storage device as recited in claim 1, wherein the control circuitry is further operable to disable host access to the first secure data by disabling access to locations of the non-volatile memory storing the first secure data.

5. The data storage device as recited in claim 1, wherein the control circuitry is further operable to encrypt the first secure data when stored in the non-volatile memory.

6. The data storage device as recited in claim 5, wherein the control circuitry is further operable to disable the host access to the first secure data by erasing a decryption key for decrypting the first secure data.

7. The data storage device as recited in claim 1, wherein the second data comprises plaintext data stored in the non-volatile memory.

8. The data storage device as recited in claim 1, wherein:
   the first secure data comprises first encrypted data encrypted using a first key; and
   the second data comprises second encrypted data encrypted using a second key.

9. The data storage device as recited in claim 1, wherein the control circuitry is further operable to:
   receive an access command from a host to access the first secure data; and
   when the host access to the first secure data is disabled, return dummy data to the host.

10. The data storage device as recited in claim 1, wherein the control circuitry is further operable to:
    receive an access command from a host to access the first secure data; and
    when the host access to the first secure data is disabled, return an error message to the host.

11. The data storage device as recited in claim 1, wherein the physical feature comprises a detachable chip using a pull strip.

12. The data storage device as recited in claim 1, wherein the control circuitry is further operable to disable the host access to the first secure data by configuring a flag stored in the non-volatile memory.

13. The data storage device as recited in claim 1, wherein the data storage device comprises a disk drive comprising a disk and a head actuated over the disk.

14. The data storage device as recited in claim 1, wherein the data storage device comprises a solid state drive comprising a non-volatile semiconductor memory.

15. A method of operating a data storage device, the data storage device comprising a printed circuit board including a plurality of mounted chips each comprising internal circuitry, and a non-volatile memory, the method comprising:
    evaluating a physical feature of one of the chips, wherein the physical feature is physically alterable by a user;
    when the physical feature is in a first state, enabling host access to first secure data stored in the non-volatile memory; and
    when the physical feature is in a second state, disabling the host access to the first secure data and enable host access to second data stored in the non-volatile memory,
    wherein the method is performed by a control circuitry of the data storage device, the physical feature comprises a modifiable package of one of the chips, and modifying the package of one of the chips destroys at least part of the internal circuitry of the chip.

16. The method as recited in claim 15, further comprising authenticating the host access to the first secure data.

17. The method as recited in claim 15, wherein disabling the host access to the first secure data comprises erasing the first secure data.

18. The method as recited in claim 15, wherein disabling the host access to the first secure data comprises disabling access to locations of the non-volatile memory storing the first secure data.

19. The method as recited in claim 15, further comprising encrypting the first secure data when stored in the non-volatile memory.

20. The method as recited in claim 19, wherein disabling the host access to the first secure data comprises erasing a decryption key for decrypting the first secure data.

21. The method as recited in claim 15, wherein the second data comprises plaintext data stored in the non-volatile memory.

22. The method as recited in claim 15, wherein:
    the first secure data comprises first encrypted data encrypted using a first key; and
    the second data comprises second encrypted data encrypted using a second key.

23. The method as recited in claim 15, further comprising:
    receiving an access command from a host to access the first secure data; and
    when the host access to the first secure data is disabled, returning dummy data to the host.

24. The method as recited in claim 15, further comprising:
    receiving an access command from a host to access the first secure data; and
    when the host access to the first secure data is disabled, returning an error message to the host.

25. The method as recited in claim 15, wherein the physical feature comprises a detachable chip using a pull strip.

26. The method as recited in claim 15, wherein disabling the host access to the first secure data comprises configuring a flag stored in the non-volatile memory.

27. The method as recited in claim 15, wherein the data storage device comprises a disk drive comprising a disk and a head actuated over the disk.

28. The method as recited in claim 15, wherein the data storage device comprises a solid state drive comprising a non-volatile semiconductor memory.

* * * * *